United States Patent
Wu

(10) Patent No.: US 7,463,163 B2
(45) Date of Patent: Dec. 9, 2008

(54) VISUALIZED COMPUTER PLATFORM OPERATING CONDITION DISPLAYING DEVICE

(75) Inventor: Yaz-Tzung Wu, Taipei (TW)

(73) Assignee: Inventec Corporation (TW)

(*) Notice: Subject to any disclaimer, the term of this patent is extended or adjusted under 35 U.S.C. 154(b) by 1073 days.

(21) Appl. No.: 10/914,854

(22) Filed: Aug. 10, 2004

(65) Prior Publication Data

US 2006/0033730 A1    Feb. 16, 2006

(51) Int. Cl.
*G08B 21/00* (2006.01)
*G08B 5/22* (2006.01)
*G09F 9/33* (2006.01)
*G06F 1/00* (2006.01)
*G06F 11/30* (2006.01)

(52) U.S. Cl. .............. 340/815.45; 340/636.1; 713/340

(58) Field of Classification Search ........... 340/500, 340/501, 815.45, 636.1; 713/340; 362/362–365, 362/612, 577, 800; 315/129–133; 455/556.2, 455/566, 115.1–115.4, 158.4
See application file for complete search history.

(56) References Cited

U.S. PATENT DOCUMENTS

| | | | |
|---|---|---|---|
| 6,275,162 B1* | 8/2001 | Lo et al. ........... | 340/636.1 |
| 7,161,313 B2* | 1/2007 | Piepgras et al. ..... | 315/318 |
| 7,385,359 B2* | 6/2008 | Dowling et al. ..... | 315/292 |
| 2004/0014489 A1* | 1/2004 | Miyachi et al. ..... | 455/550.1 |

* cited by examiner

*Primary Examiner*—George A Bugg
*Assistant Examiner*—Jennifer Mehmood
(74) *Attorney, Agent, or Firm*—Peter F. Corless; Steven M. Jensen; Edwards Angell Palmer & Dodge LLP

(57) ABSTRACT

A visualized computer platform operating condition displaying device is proposed, which is designed for use with a computer platform for providing a visualized operating condition displaying function to the user, and which is characterized by the use of a specially-arranged light-emitting array module composed of a plurality of light-emitting units positioned at an easily-seen location on the external side of the computer platform, which can be activated to generate various forms of light-based signaling messages to indicate various operating conditions in the computer platform. By viewing the different patterns and colorizations of the light beams from the light-emitting array module, the user is able to know the various operating conditions in the computer platform and take early care on the computer platform in the event of an emergency condition in the computer platform.

15 Claims, 2 Drawing Sheets

VISUALIZED COMPUTER PLATFORM OPERATING CONDITION DISPLAYING DEVICE

BACKGROUND OF THE INVENTION

1. Field of the Invention

This invention relates to computer technology, and more particularly, to a visualized computer platform operating condition displaying device that is designed for use with a computer platform, such as a desktop computer, a notebook computer, a tablet PC, a PDA (Personal Digital Assistant), or the like, for providing a visualized operating condition displaying function for informing the user of the various operating conditions of the computer platform, including, for example, power ON/OFF status of the computer platform, current working temperature level at the main system unit of the computer platform, remaining power capacity of battery, and so on.

2. Description of Related Art

A computer platform, such as a desktop computer, a notebook computer, a tablet PC, or a PDA (Personal Digital Assistant), is typically provided with operating condition displaying functions used to inform the user of the various operating conditions of the computer platform, such as power ON/OFF status of the computer platform, current working temperature level at the main system unit of the computer platform, remaining power capacity of battery, and so on, for the purpose of allowing the user to work with the computer platform properly.

Presently, most computer platforms utilize the operating system to display information about current working temperature level at CPU and remaining power capacity of battery through windows interface on the screen, so that user can view this information from the screen. One drawback to this practice, however, is that the user needs to use the mouse to open the windows where the information of operating condition is displayed, and this practice is apparently quite laborious and time-consuming to do. In addition, since this practice requires the user to manually open windows to view the information about the working temperature level at CPU, it would be unable to promptly notify the user of an emergency condition when the working temperature level at CPU is overly high, and therefore the computer platform may be damaged in the event of such an emergency condition without early care from the user.

SUMMARY OF THE INVENTION

It is therefore an objective of this invention to provide a visualized computer platform operating condition displaying device for use with a computer platform to provide a visualized operating condition displaying function that allows the user to be informed of the various operating condition of the computer platform by way of an easily-seen visualized effect from the external side of the computer platform so that the user can be promptly warned of an emergency condition to take early care on the computer platform.

The visualized computer platform operating condition displaying device according to the invention is designed for use with a computer platform, such as a desktop computer, a notebook computer, a tablet PC, a PDA (Personal Digital Assistant), or the like, for providing a visualized operating condition displaying function for informing the user of the various operating conditions of the computer platform, including, for example, power ON/OFF status of the computer platform, current working temperature level at the main system unit of the computer platform, remaining power capacity of battery, and so on.

The visualized computer platform operating condition displaying device according to the invention is characterized by the use of a specially-arranged light-emitting array module composed of a plurality of light-emitting units positioned at an easily-seen location on the external side of the computer platform, which can be activated to generate various forms of light-based signaling messages to indicate various operating conditions in the computer platform. By viewing the different patterns and colorizations of the light beams from the light-emitting array module, the user is able to know the various operating conditions in the computer platform and take early care on the computer platform in the event of an emergency condition in the computer platform.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The visualized computer platform operating condition displaying device according to the invention is disclosed in full details by way of preferred embodiments in the following with reference to the accompanying drawings.

Figure 1:
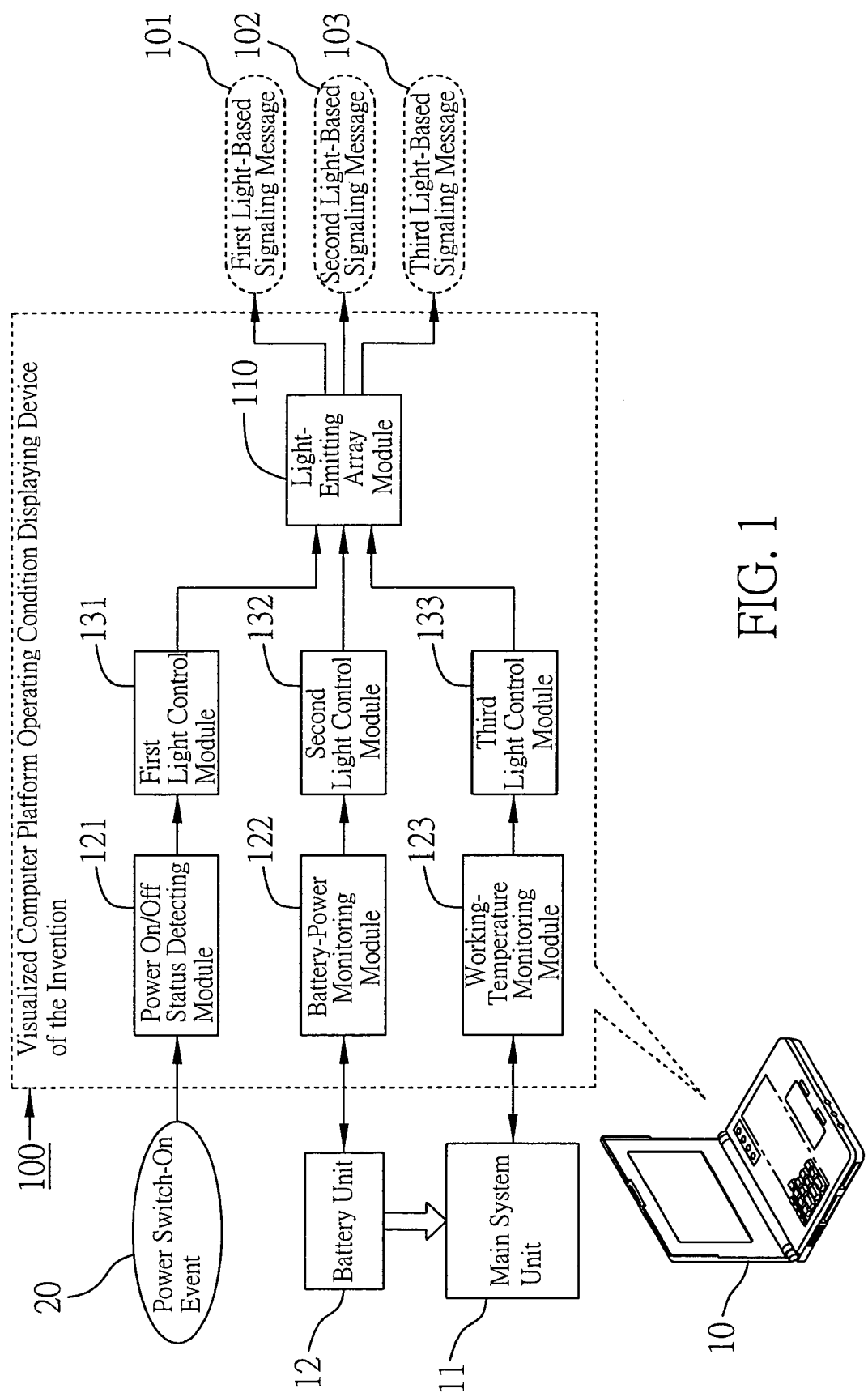
FIG. 1 is a schematic diagram showing the architecture of the visualized computer platform operating condition displaying device according to the invention.

FIG. 1 is a schematic diagram showing the architecture of the visualized computer platform operating condition displaying device according to the invention (as the part enclosed in the dotted box indicated by the reference numeral 100). As shown, the visualized computer platform operating condition displaying device of the invention 100 is designed for use with a computer platform 10, such as a desktop computer, a notebook computer, a tablet PC, a PDA (Personal Digital Assistant), or the like, which is optionally equipped with a battery unit 12, for providing a visualized operating condition displaying function to inform the user of the various operating condition of the computer platform 10, including, for example, the power ON/OFF status of the computer platform 10, the current working temperature level at the main system unit 11 of the computer platform 10, the remaining power capacity of the battery unit 12, and so on.

The modularized component model of the visualized computer platform operating condition displaying device of the invention 100 comprises: (a) a light-emitting array module 110; (b) a power on/off status detecting module 121; (c) a battery-power monitoring module 122; (d) a working-temperature monitoring module 123; (e) a first light control module 131; (f) a second light control module 132; and (g) a third light control module 133.

Figure 2:
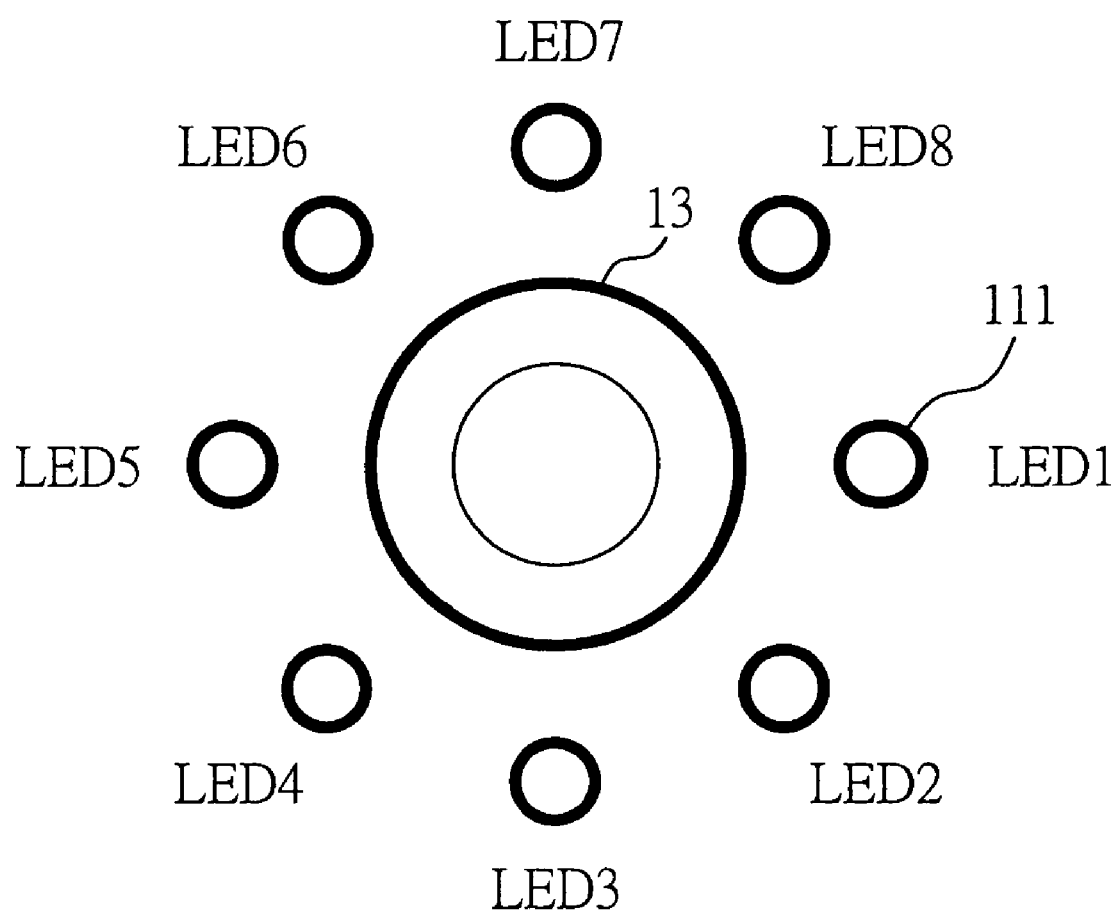
FIG. 2 is a schematic diagram showing a preferred embodiment of the light-emitting array module utilized by the visualized computer platform operating condition displaying device according to the invention.

As shown in FIG. 2, the light-emitting array module 110 is composed of a plurality of light-emitting units 111 (for example, 8 light-emitting diodes LED1, LED2, LED3, LED4, LED5, LED6, LED7, LED8) arranged in a specific array pattern, such as a circular array pattern, on the external side of the computer platform 10, preferably around the main power switch 13 on the computer platform 10. Fundamentally, in accordance with the invention, the light-emitting array module 110 should be arranged at a location on the external side of the computer platform 10 that is always visible to the user when the user is working with the computer platform 10. In this embodiment, for example, the light-emitting units 111 in the light-emitting array module 110 are each a light-emitting diode (LED), and more preferably a dual LED that is each capable of emitting two light beams of different colors, such as (blue+green), (blue+red), (blue+yellow), (blue+purple), etc.; but the choice of the dual light colors for each of the light-emitting units 111 is an arbitrary design choice.

The power on/off status detecting module 121 is capable of detecting whether the computer platform 10 has been powered on (i.e., whether a power switch-on event 20 has occurred on the computer platform 10); if YES, the power on/off status detecting module 121 will responsively issue a power-on message to the first light control module 131.

The battery-power monitoring module 122 is capable of being activated after the computer platform 10 is powered on to continually monitor the remaining power capacity of the battery unit 12 and thereby generate a battery-power indication message to the second light control module 132. In this preferred embodiment, for example, the full power capacity range of the battery unit 12 (i.e., the range from the maximum charged capacity to the pre-specified critical level) is divided into a predetermined number of levels, for example 8 levels. At each level of power capacity, the battery-power monitoring module 122 will responsively generate a corresponding battery-power indication message indicative of the current level of remaining power capacity of the battery unit 12.

The working-temperature monitoring module 123 is capable of being activated after the computer platform 10 is powered on to continually monitor the working temperature at the main system unit 11 of the computer platform 10 (including CPU and its interfaced chips) and thereby generate a corresponding working-temperature indication message to the third light control module 133.

The first light control module 131 is capable of being activated in response to the power-on message from the power on/off status detecting module 121 to drive the light-emitting units 111 in the light-emitting array module 110 to be lighted up in a predetermined manner (such as all the 8 dual LEDs are lighted up in blue) to serve as a first light-based signaling message 101 that is pre-specified to indicate that the power of the computer platform 10 is currently switched on. It is to be noted that the emitted light pattern and colorization of the first light-based signaling message 101 from the light-emitting array module 110 can be an arbitrary design choice, and therefore it can be alternatively realized in many other various forms to indicate the power-on status of the computer platform 10.

The second light control module 132 is capable of being activated in response to the battery-power indication message from the battery-power monitoring module 122 to drive the light-emitting array module 110 to emit light beams in a predetermined manner to serve as a second light-based signaling message 102 to indicate the current remaining power capacity of the battery unit 12. For example, when the remaining power capacity of the battery unit 12 is at the predetermined first level (i.e., full capacity), it causes the first dual LED light-emitting unit 111 in the light-emitting array module 110 to be lighted up in blue; when at the second level, it causes the second dual LED light-emitting unit 111 in the light-emitting array module 110 to be lighted up in blue; and so forth, when at the eighth level (i.e., bottommost level), it causes the eighth (i.e., the last) dual LED light-emitting unit 111 in the light-emitting array module 110 to be lighted up in blue. Therefore, by viewing which of the 8 dual LED light-emitting unit 111 in the light-emitting array module 110 is currently being lighted up, the user is able to know the level of current remaining power capacity of the battery unit 12. It is to be noted that the emitted light pattern and colorization of the second light-based signaling message 102 can be an arbitrary design choice, and therefore it can be realized in many other various forms to indicate the remaining power capacity of the battery unit 12.

The third light control module 133 is capable of being activated in response to the working-temperature indication message from the working-temperature monitoring module 123 to drive the light-emitting array module 110 to emit light beams in a predetermined manner to serve as a third light-based signaling message 103 to indicate the current working temperature level at the main system unit 11 of the computer platform 10. For example, when the working temperature is low (near the room temperature), it causes the 8 dual LED light-emitting unit 111 in the light-emitting array module 110 to be sequentially lighted up in clockwise direction respectively in different colors (for example, sequentially lighted up respectively in blue, green, red, yellow, purple, orange, pink, and cyan) to thereby produce a low-speed circularly-rotating colorful light effect; and when the working temperature is high, it increases the speed of the circularly-rotating light effect to more effectively draw the attention of the user, and thereby warn the user of such an emergency condition for the user to take necessary care on the computer platform 10 to prevent thermal damage. It is to be noted that the emitted light pattern and colorization of the third light-based signaling message 103 can be an arbitrary design choice, and therefore it can be realized in many other various forms to indicate the working temperature level at the main system unit 11 of the computer platform 10.

Referring to FIG. 1 together with FIG. 2, during actual use, when the user presses down the main power switch 13 of the computer platform 10, it causes the occurrence of a power switch-on event 20 which then causes the power on/off status detecting module 121 to issue a power-on message to the first light control module 131 to activate the first light control module 131 to drive the light-emitting units 111 in the light-emitting array module 110 to be lighted up in a predetermined manner (such as all the 8 dual LEDs are lighted up in blue) to serve as a first light-based signaling message 101 that is used to indicate that the power of the computer platform 10 is currently switched on After the computer platform 10 is powered on, it activates the battery-power monitoring module 122 to continually monitor the remaining power capacity of the battery unit 12 and thereby generate a battery-power indication message to the second light control module 132. In response, the second light control module 132 is activated to drive the light-emitting array module 110 to emit light beams in a predetermined manner to serve as a second light-based signaling message 102 to indicate the current remaining power capacity of the battery unit 12. For example, when the remaining power capacity of the battery unit 12 is at the predetermined first level (i.e., full capacity), it causes the first dual LED light-emitting unit 111 in the light-emitting array module 110 to be lighted up in blue; when at the second level, it causes the second dual LED light-emitting unit 111 in the light-emitting array module 110 to be lighted up in blue; and so forth, when at the eighth level (i.e., bottommost level), it causes the eighth (i.e., the last) dual LED light-emitting unit 111 in the light-emitting array module 110 to be lighted up in blue. Therefore, by viewing which of the 8 dual LED light-emitting unit 111 in the light-emitting array module 110 is currently being lighted up, the user is able to know the level of current remaining power capacity of the battery unit 12.

In addition, after the computer platform 10 is powered on, it also activates the working-temperature monitoring module 123 to continually monitor the working temperature at the main system unit 11 of the computer platform 10 (including CPU and its interfaced chips) to thereby generate a corresponding working-temperature indication message to the third light control module 133. In response, the third light control module 133 is activated to drive the light-emitting array module 110 to emit light beams in a predetermined manner to serve as a third light-based signaling message 103 to indicate the current working temperature level at the main system unit 11 of the computer platform 10. For example, when the working temperature is low (near the room temperature), it causes the 8 dual LED light-emitting unit 111 in the light-emitting array module 110 to be sequentially lighted up in clockwise direction respectively in different colors (for example, sequentially lighted up respectively in blue, green, red, yellow, purple, orange, pink, and cyan) to thereby produce a low-speed circularly-rotating colorful light effect; and when the working temperature is high, it increases the speed of the circularly-rotating light effect to more effectively draw the attention of the user and thereby warn the user of such an emergency condition for the user to take necessary care on the computer platform 10 to prevent thermal damage.

In conclusion, the invention provides a visualized computer platform operating condition displaying device, for use with a computer platform for providing a visualized operating condition displaying function to the user, which is characterized by the use of a specially-arranged light-emitting array module composed of a plurality of light-emitting units positioned at an easily-seen location on the external side of the computer platform, which can be activated to generate various forms of light-based signaling messages to indicate various operating conditions in the computer platform. By viewing the different patterns and colorizations of the light beams from the light-emitting array module, the user is able to know the various operating conditions in the computer platform and take early care on the computer platform in the event of an emergency condition in the computer platform. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A visualized computer platform operating condition displaying device for use with a computer platform equipped with a battery unit for providing a visualized operating condition displaying function;

the visualized computer platform operating condition displaying device comprising:

a light-emitting array module, which is composed of a plurality of light-emitting units arranged in an array pattern on the external side of the computer platform;

a power on/off status detecting module, detects whether the computer platform has been powered on; and if yes, issues a power-on message;

a battery-power monitoring module, monitors the remaining power capacity of the battery unit to thereby generate a corresponding battery-power indication message indicative of the remaining power capacity of the battery unit;

a working-temperature monitoring module, monitors the current working temperature inside the computer platform to thereby generate a corresponding working-temperature indication message indicative of the detected working temperature level;

a first light control module, activates in response to the power-on message from the power on/off status detecting module to drive the light-emitting array module to emit lights in a first predetermined manner to serve as a first light-based signaling message used to indicate that the computer platform is currently powered on;

a second light control module, activates in response to the battery-power indication message from the battery-power monitoring module to drive the light-emitting array module to emit lights in a second predetermined manner to serve as a second light-based signaling message used to indicate the current level of remaining power capacity of the battery unit; and a third light control module, activates in response to the working-temperature indication message from the working-temperature monitoring module to drive the light-emitting array module to emit lights in a third predetermined manner to serve as a third light-based signaling message used to indicate the current level of working temperature inside the computer platform.

2. The visualized computer platform operating condition displaying device of claim 1, wherein the computer platform is a notebook computer.

3. The visualized computer platform operating condition displaying device of claim 1, wherein the computer platform is a desktop computer.

4. The visualized computer platform operating condition displaying device of claim 1, wherein the computer platform is a tablet computer.

5. The visualized computer platform operating condition displaying device of claim 1, wherein the computer platform is a PDA (Personal Digital Assistant) unit.

6. The visualized computer platform operating condition displaying device of claim 1, wherein the light-emitting units in the light-emitting array module are arranged in a circular array around a power switch on the computer platform.

7. The visualized computer platform operating condition displaying device of claim 1, wherein the light-emitting units in the light-emitting array module are each a dual light-emitting diode.

8. A visualized computer platform operating condition displaying device for use with a computer platform for providing a visualized operating condition displaying function;

the visualized computer platform operating condition displaying device comprising:

a light-emitting array module, which is composed of a plurality of light-emitting units arranged in an array pattern on the external side of the computer platform;

a power on/off status detecting module, detects whether the computer platform has been powered on; and if yes, issues a power-on message;

a working-temperature monitoring module, monitors the current working temperature inside the computer platform to thereby generate a corresponding working-temperature indication message indicative of the detected working temperature level;

a first light control module, activates in response to the power-on message from the power on/off status detecting module to drive the light-emitting array module to emit lights in a first predetermined manner to serve as a first light-based signaling message used to indicate that the computer platform is currently powered on; and a second light control module, activates in response to the working-temperature indication message from the working-temperature monitoring module to drive the light-emitting array module to emit lights in a second predetermined manner to serve as a second light-based signaling message used to indicate the current level of working temperature inside the computer platform.

9. The visualized computer platform operating condition displaying device of claim 8, wherein the computer platform is a notebook computer.

10. The visualized computer platform operating condition displaying device of claim 8, wherein the computer platform is a desktop computer.

11. The visualized computer platform operating condition displaying device of claim 8, wherein the computer platform is a tablet computer.

12. The visualized computer platform operating condition displaying device of claim 8, wherein the computer platform is a PDA (Personal Digital Assistant) unit.

13. The visualized computer platform operating condition displaying device of claim 8, wherein the light-emitting units in the light-emitting array module are arranged in a circular array around a power switch on the computer platform.

14. The visualized computer platform operating condition displaying device of claim 8, wherein the light-emitting units in the light-emitting array module are each a dual light-emitting diode.

15. The visualized computer platform operating condition displaying device of claim 8, further comprising:
    a battery-power monitoring module, monitors the remaining power capacity of the battery unit to thereby generate a corresponding battery-power indication message indicative of the remaining power capacity of the battery unit; and
    a third light control module, activates in response to the battery-power indication message from the battery-power monitoring module to drive the light-emitting array module to emit lights in a third predetermined manner to serve as a third light-based signaling message used to indicate the current level of remaining power capacity of the battery unit.

* * * * *